United States Patent
Espindola et al.

(10) Patent No.: US 6,304,691 B1
(45) Date of Patent: Oct. 16, 2001

(54) WAVELENGTH DIVISION MULTIPLEXED OPTICAL COMMUNICATION SYSTEM HAVING REDUCED SHORT WAVELENGTH LOSS

(75) Inventors: Rolando Patricio Espindola, New Providence, NJ (US); Jefferson Lynn Wagener, Aberdeen, WA (US)

(73) Assignee: Lucent Technologies,INC, Murray Hill, NJ (US)

( * ) Notice: Subject to any disclaimer, the term of this patent is extended or adjusted under 35 U.S.C. 154(b) by 0 days.

(21) Appl. No.: 09/338,066

(22) Filed: Jun. 23, 1999

Related U.S. Application Data

(63) Continuation-in-part of application No. 09/159,907, filed on Sep. 24, 1998, now Pat. No. 6,122,421.
(60) Provisional application No. 60/120,767, filed on Feb. 19, 1999.

(51) Int. Cl.[7] ....................................... G02B 6/28
(52) U.S. Cl. ............................................. 385/24; 385/37
(58) Field of Search .......................................... 385/24, 37

(56) References Cited

U.S. PATENT DOCUMENTS

| | | | | |
|---|---|---|---|---|
| 6,122,418 | * | 9/2000 | Ellis | 385/27 |
| 6,122,421 | * | 9/2000 | Adams et al. | 385/37 |

* cited by examiner

*Primary Examiner*—Hung N. Ngo
(74) *Attorney, Agent, or Firm*—Lowenstein Sandler PC

(57) ABSTRACT

In accordance with the invention, a WDM optical system comprises a transmission line with a net negative dispersion rather than the conventional net positive dispersion and a DCG with a positive dispersion rather than negative dispersion. With this design, short wavelengths entering the grating are reflected first before the long wavelengths, minimizing the path of short wavelengths within the grating and thereby avoiding short wavelength cladding loss. In advantageous embodiments, the DCG compensates for both the net negative dispersion and dispersion slope of at least two signal channels and preferably of all signal channels.

17 Claims, 3 Drawing Sheets

WAVELENGTH DIVISION MULTIPLEXED OPTICAL COMMUNICATION SYSTEM HAVING REDUCED SHORT WAVELENGTH LOSS

CROSS REFERENCE TO RELATED APPLICATIONS

This application is a continuation-in-part of U.S. patent application Ser. No. 09/159,907 filed. Sep. 24, 1998 (now U.S. Pat. No. 6,122,421). It also claims the benefit of Provisional U.S. Application Ser. No. 60/120,767 of identical title filed by the present applicants on Feb. 19, 1999.

FIELD OF THE INVENTION

This invention relates to optical communication systems and, in particular, to wavelength division multiplexed optical communication systems (WDM and dense WDM systems) having reduced short wavelength channel loss.

BACKGROUND OF THE INVENTION

Optical communication systems are usually based on high purity silica optical fiber as the transmission medium. Conventional terrestrial systems are typically designed to transmit optical signals in a wavelength range where longer wavelength components are subject to slightly longer propagation time delay than shorter wavelengths (positive chromatic dispersion). To prevent this dispersion from deteriorating the information content of the optical signals, early systems used a single channel at a wavelength where dispersion is low or zero.

As it has become desirable to utilize many channels over a wider range of optical wavelengths (WDM systems), chromatic dispersion has required more precise compensation. WDM systems are important for their ability to transmit vast amounts of information and for their ability to incorporate network functions such as add/drop and cross connecting. But as the bit rate of WDM channels increases, chromatic dispersion compensation becomes critical.

Typical dispersion compensation schemes for WDM systems involve the use of dispersion compensating fiber having negative dispersion characteristics. The transmission fibers used in terrestrial systems typically exhibit net positive chromatic dispersion which, for WDM systems, cannot be precisely compensated by dispersion compensating fiber. Although segments of such fiber can be used to compensate the accumulated dispersion in a transmission fiber span, optimum compensation is usually achieved only for chosen channels (typically in the middle of the transmission band). There remains a residual wavelength dependent dispersion in channels located at the extremes of the transmission band due to the dispersion slope.

Compensating the accumulated dispersion of the extreme channels can require a dispersion compensating grating (DCG). DCGs are chirped fiber Bragg gratings used in reflection mode and oriented so that the long wavelengths are reflected first before short wavelengths. In this manner, optical pulses broadened due to the accumulated positive chromatic dispersion can be recompressed in time. Typical arrangement using DCGs are described in U.S. Pat. No. 4,953,939 issued to R. E. Epworth on Sep. 4, 1990 and U.S. Pat. No. 5,701,188 issued to M. Shigematsu et al. on Dec. 23, 1997, both of which are incorporated herein by reference. One of the main advantages of using DCGs is that the amount of dispersion and the dispersion slope can be easily adjusted by setting the grating chirp parameters. Another advantage is their low non-linearity compared to conventional dispersion compensating fibers.

A major drawback of typical DCG compensation is cladding loss of short wavelength channels. Cladding loss in a Bragg grating is due to coupling of the forward-propagating core mode to backward propagating cladding modes. It only occurs on the shorter wavelength side of the Bragg reflection peak because of a phase matching requirement. In dense WDM systems using DCGs, the short wavelength channels can experience cladding loss of several decibels. Accordingly, there is a need for a WDM system having reduced short wavelength loss.

SUMMARY OF THE INVENTION

In accordance with the invention, a WDM optical system comprises a transmission line with a net negative dispersion rather than the conventional net positive dispersion and a DCG with a positive dispersion rather than negative dispersion. With this design, short wavelengths entering the grating are reflected first before the long wavelengths, minimizing the path of short wavelengths within the grating and thereby avoiding short wavelength cladding loss. In advantageous embodiments, modules containing the DCG compensate the net negative dispersion and the dispersion slope of at least two signal channels and preferably of all signal channels.

BRIEF DESCRIPTION OF THE DRAWINGS

The advantages, nature and various additional features of the invention will appear more fully upon consideration of the illustrative embodiments now to be described in detail in connection with the accompanying drawings in which.

It is to be understood that these drawings are for purposes of illustrating the concepts of the invention and, except for the graph, are not to scale.

DETAILED DESCRIPTION

Figure 1:
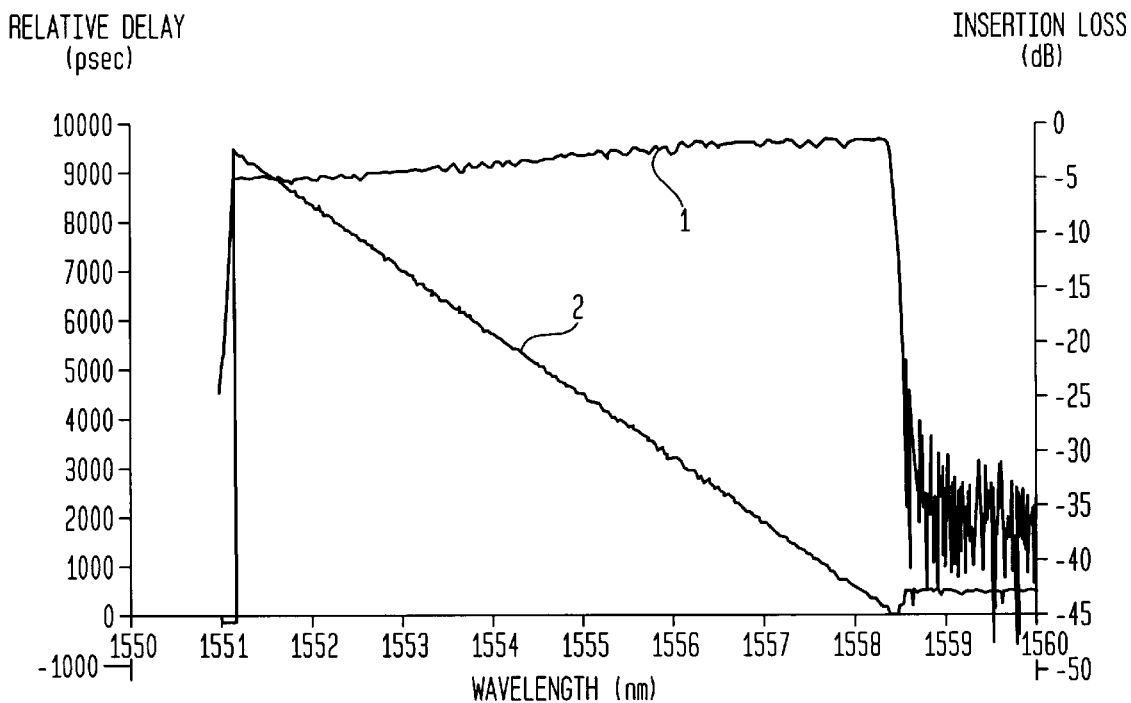
FIG. 1 is a graphical illustration showing the insertion loss versus wavelength and the relative delay of a typical chirped fiber Bragg grating providing positive dispersion.

Referring to the drawings, FIG. 1 is a graphical illustration useful in understanding the problem to which the invention is directed. Specifically, FIG. 1 is a plot of the insertion loss as a function of wavelength for a chirped fiber Bragg grating reflecting near 1550 nm. Curve 1 shows that for a negative dispersion DCG, insertion loss increases with decreasing wavelength. This is the short wavelength cladding loss. In contemplated dense WDM systems using wavelengths as short as 1530 nm, the cladding loss occurs within the signal spectrum and can deteriorate the information content of the transmitted signals. Curve 2 shows the relative delay as a function of wavelength.

Figure 2:
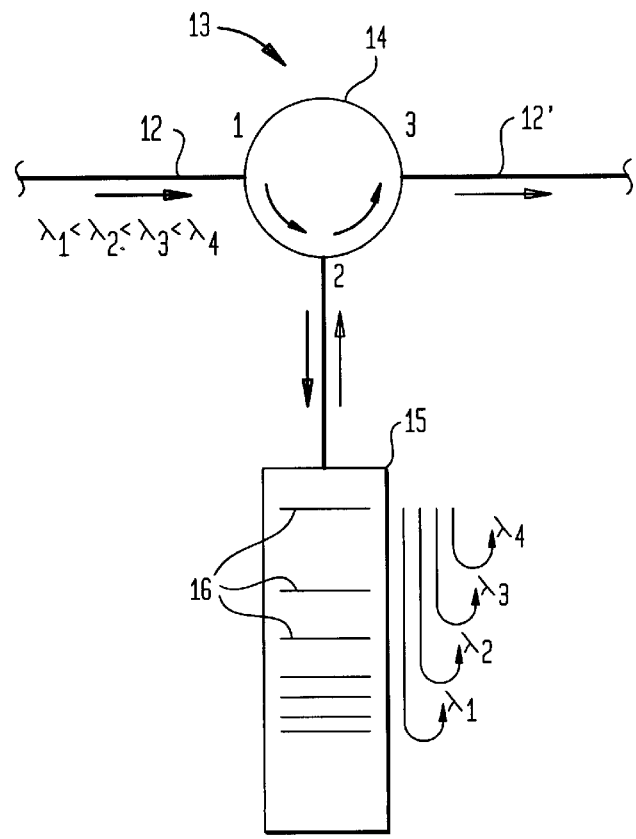
FIG. 2 is a schematic illustration of the operation of a conventional negative dispersion DCG.

FIG. 2 is a schematic illustration of a conventional compensator 13 providing negative dispersion useful in understanding why such compensators are deleterious to WDM systems. In essence, the compensator comprises a circulator 14 and a chirped Bragg grating 15 comprising a plurality of index perturbations 16 spaced apart by intervals which gradually decrease with distance from the grating input. The circulator 14 receives signal channels from one segment of transmission line 12 at port 1 and directs the signals through port 2 to grating 15. The reflected signals are redirected to a second segment 12' at port 3. If a hypothetical WDM system using wavelength channels $\lambda$, $\lambda_2$, $\lambda_3$, $\lambda_4$ (where $\lambda_1<\lambda_2<\lambda_3<\lambda_4$) provides input into the grating, the channel wavelengths $\lambda_i$ will be reflected at respective spacings $\Lambda$ where the Bragg condition is met, i.e. $\lambda_i=2n_{eff}\Lambda$. This means that in a negative dispersion DCG, the shorter wavelengths e.g. $\lambda_1$ will travel farthest into the grating before being reflected, subjecting the short wavelength channels to relatively large cladding loss.

Figure 3:
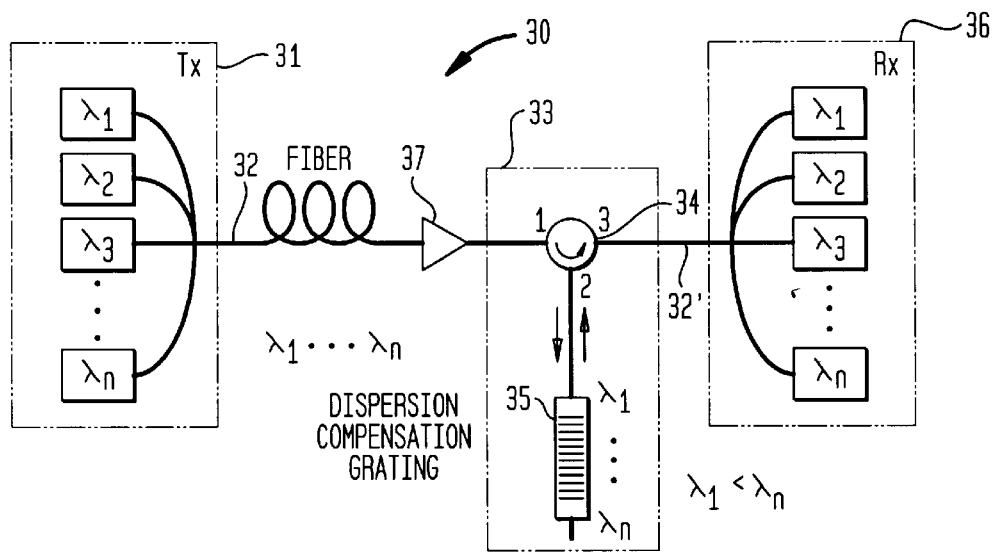
FIG. 3 schematically illustrates a WDM optical fiber communication system having reduced short wavelength loss.

FIG. 3 schematically illustrates a WDM optical fiber communication system 30 which effectively eliminates short wavelength cladding loss. In essence, the system 30 comprises a multiwavelength optical transmitter 31, a negative dispersion transmission fiber 32, a positive dispersion compensator 33 comprising a circulator 34 and a positive dispersion DCG 35 to compensate the negative dispersion fiber 32, and a multiwavelength optical receiver 36. Optionally, depending on the length of the system, an optical amplifier 37 can be disposed between the fiber 32 and the positive dispersion compensator 33. Long distance transmission systems may comprise a plurality of segments of fiber 32, 32' with respective segments interconnected by compensators 33 and/or amplifiers 37. Long systems may also include one or more intermediate add/drop nodes (not shown) between successive segments of transmission fiber 32.

In operation, multiple wavelength signal channels at wavelengths $\lambda_1<\lambda_2<\ldots<\lambda_n$ are launched by transmitter 31 down fiber 32. The channels incur negative dispersion as they pass through the fiber. The signals can be amplified at amplifier 37. When the signals reach positive dispersion compensator 33, they enter port 1 of circulator 34 and pass via port 1 to the input of positive dispersion DCG 35. The dispersion compensated signals reflect back to port 2 of the circulator and pass to port 3 where they return to fiber 32'. From fiber 32' the signals pass to receiver 36. Typically the signal channels will be in a wavelength range comprising 1520 nm to 1620 nm.

Figure 4:
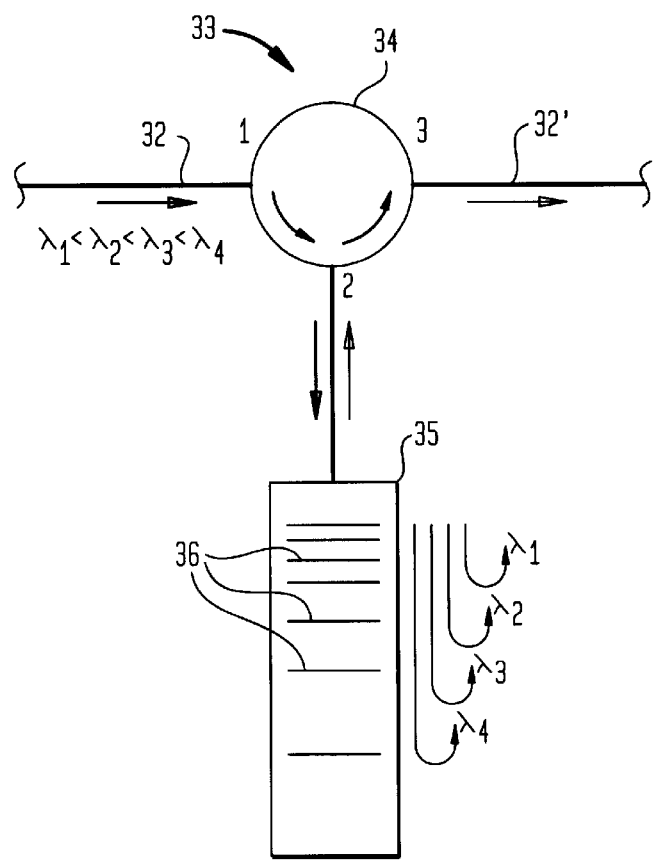
FIG. 4 is a schematic illustration of the operation of the DCG used in the system of FIG. 3.

FIG. 4 is a schematic illustration of the operation of the positive dispersion compensator 33 used in the system of FIG. 3. The DCG is a chirped Bragg grating 35 comprising a plurality of index perturbations 36 spaced apart by intervals which gradually increase with distance from the grating input. Thus if $\lambda_1<\lambda_2<\lambda_3<\lambda_4$ are provided to the grating input, the shorter wavelengths, e.g. $\lambda_1$, will be reflected first and therefore will suffer no appreciable cladding loss. Even though the longer wavelengths, e.g. $\lambda_4$, travel further, they do not experience cladding loss.

A convenient way to implement the invention is in the form of self-contained positive dispersion modules including positive dispersion DCGs. Advantageously, the modules can also include lengths of positive dispersion fiber in compact form (coils) for supplementing the DCGs. The modules will compensate at least two signal channels in the wavelength range of interest and preferably all channels in the range. In addition, the modules can include optical fiber amplifiers to provide optimal positioning of the DCGs in relation to the amplifiers.

Figure 5:
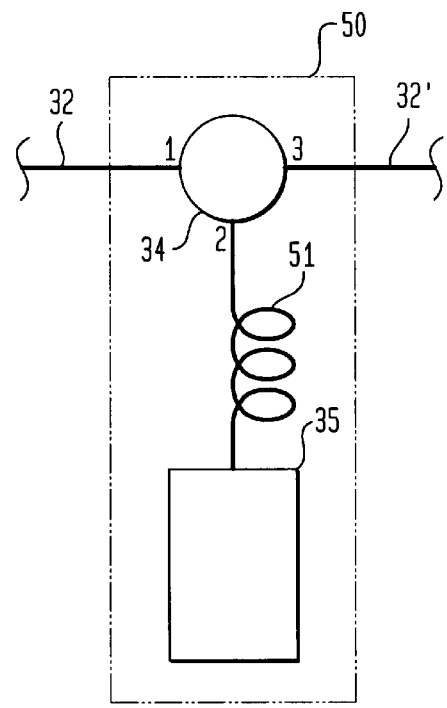
FIG. 5 schematically illustrates a positive dispersion module.

FIG. 5 illustrates a simple positive dispersion module 50 comprising a circulator 34, a coil of positive dispersion fiber 51, and a positive dispersion DCG 35. The positive dispersion fiber can be a standard positive dispersion transmission fiber coiled for use as a dispersion compensation fiber. The module 50 can be deployed in an optical fiber communication system between segments of negative dispersion transmission fiber.

An advantage of this module is that it can compensate dispersion in both magnitude and slope without the use of excessively long DCGs. The fiber 51 can compensate much of the magnitude and some of the slope, permitting a relatively short DCG to compensate the remainder of the magnitude and the remainder of the slope. The positive dispersion DCG, while compensating negative dispersion, can provide either positive or negative slope compensation.

Figure 6:
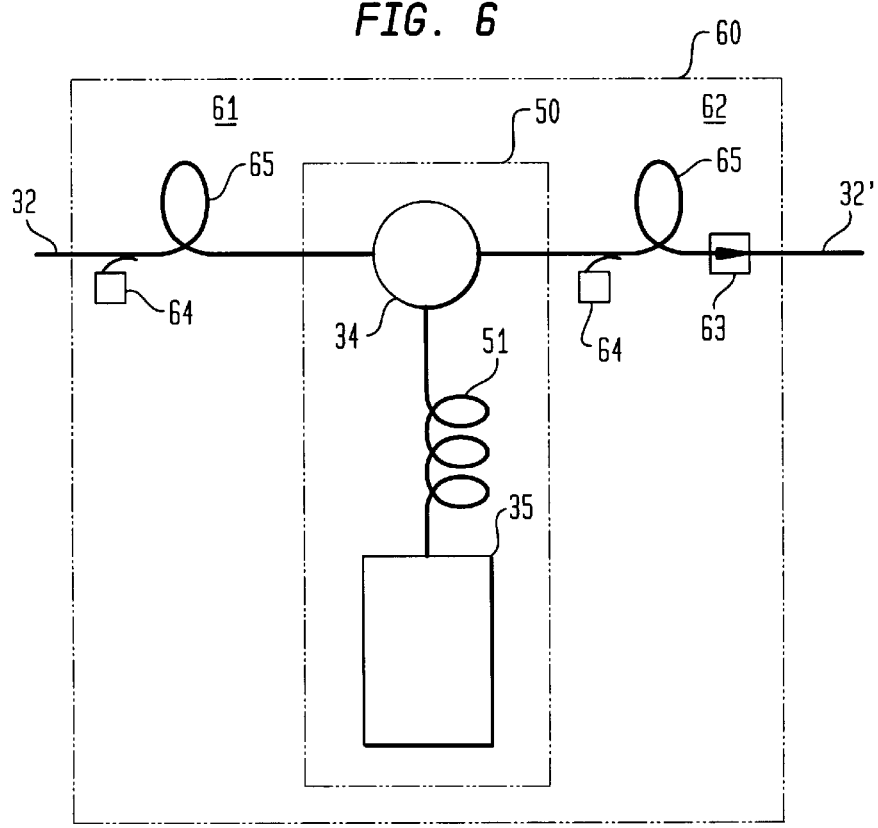
FIG. 6 illustrates an alternative positive dispersion module.

FIG. 6 illustrates an alternative positive dispersion module 60 especially useful in long optical fiber communication systems requiring intermediate amplification. In essence, the module 60 comprises a first optical fiber amplifier 61, a positive dispersion element 50 including a positive dispersion DCG such as the module of FIG. 5, a second fiber amplifier 62, and an isolator 63. Each amplifier includes a pump source 64 and a length (typically coiled) of rare-earth doped fiber 65. In typical applications the amplifier comprises erbium-doped fiber pumped with 980 nm light. The dispersion element 50 is disposed in the path between the two amplifiers 61, 62. This arrangement minimizes noise while amplifying to compensate losses including those in the dispersion element 50.

The invention may now be better understood by consideration of the following specific examples.

EXAMPLE 1

Assume a fiber optical transmission system consisting of 6 fiber spans, each 80 km long, with optical amplifiers after each span to compensate for the optical attenuation of the span. In contrast to current terrestrial systems, let the fiber be a negative dispersion fiber such as Truewave XL marketed by Lucent Technologies Inc., Murray Hill, N.J.

Let us assume that the fiber has a dispersion of −4 ps/nm-km at 1550 nm. After each 80 km fiber span, the optical channels will accumulate a dispersion:

accumulated dispersion=(−4 ps/nm-km)(80 km)=−320 ps/nm.

This is the amount of dispersion that the chirped fiber Bragg grating (DCG) must compensate over the largest possible bandwidth. Commercially available chirped fiber Bragg gratings can be as long as 2.4 meter. Assuming, for the sake of simplicity, a 1 meter long grating, then the maximum time delay of any chirped fiber grating is given by:

$$\tau = \frac{2*L*n_{eff}}{c},$$

where $\tau$ is the delay time, L is the length of the grating, $n_{eff}$ is the effective index of the fundamental mode of the fiber and c is the speed of light in vacuum. The maximum time delay for a 1 meter long fiber grating is 10,000 picoseconds.

The amount of dispersion for the 1 meter long grating depends on the chirped parameter of the grating. Assuming a chirped parameter of 0.3 nm/cm, we can have an optical bandwidth:

bandwidth=(0.3 nm/cm)(100 cm)=30 nm.

The chromatic dispersion of the grating can be calculated by dividing the time delay by the optical bandwidth:

dispersion=10000 ps/30 nm=333 ps/nm.

So, by utilizing this grating in a manner where the short wavelength channels are reflected first before the long wavelength channels (positive chromatic dispersion), we can substantially compensate the dispersion of 80 km of negative dispersion fiber over a bandwidth of 30 nm.

If we consider a system where the channel spacing is 50 Ghz (0.4 nm), we can compensate the dispersion of 75 optical channels with a single grating without short wavelength cladding mode loss. If wider bandwidth is required, we can make the grating longer or concatenate more than one grating.

EXAMPLE 2

Consider a dispersion compensating module designed to compensate the dispersion and/or dispersion slope of a transmission fiber span of 80 km in length. Let us assume initially that the fiber is the transmission fiber of Example 1 having dispersion of −4 ps/nm-km at 1550 nm and a dispersion slope of 0.112 ps/(nm$^2$-km).

For an 80 km fiber span length, the accumulated dispersion is dispersion=80 km*−4 ps/nm-km=−320 ps/nm;

and dispersion slope=80 km*0.112 ps/nm$^2$-km)=8.96 ps/nm$^2$.

Let the dispersion compensation module consist of a positive dispersion fiber and a dispersion compensating grating. Assume that the dispersion compensating fiber has positive dispersion of +17 ps/nm-km and a positive dispersion slope of 0.05 ps/(nm$^2$-km). Assuming that the module contains 10 km of dispersion compensating fiber, the residual dispersion and dispersion slope of the transmission fiber and DCF is:

residual dispersion=−320 ps/nm+(17 ps/nm-km)(10 km)=−150 ps/nm;

and residual dispersion slope=8.96 ps/nm$^2$+[0.05 ps/(nm$^2$-km)]*(10 km)=9.46 ps/nm$^2$.

The dispersion compensating grating is designed to provide positive dispersion and negative dispersion slope to compensate for the residual dispersion and dispersion slope. A design procedure for chirped fiber grating with specific dispersion and dispersion slope was described by J. A. R. Williams et al., *Opt. Comm.*, vol. 116, pages 62–66, 1995, which is incorporated herein by reference.

Using this design procedure, the DCG needs a positive dispersion at 1550 nm of 150 ps/nm and a dispersion slope of −9.46 ps/nm$^2$. This gives a positive dispersion of 292 ps/nm at 1535 nm and a positive dispersion of 8 ps/nm at 1565 nm. The DCG compensates the dispersion for a 30 nm bandwidth without short wavelength cladding mode loss.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed:

1. A wavelength-division multiplexed optical communications system comprising a transmitter for providing a plurality of distinct wavelength optical signal channels, an optical transmission path, a dispersion compensator coupled to said transmission path for compensating the optical dispersion of signal channels, and a multiwavelength optical receiver, the improvements wherein:

said transmission path comprises a net negative dispersion path for the plurality of signal channels, and said dispersion compensator comprises a dispersion compensating grating for compensating the net negative dispersion of at least two signal channels in the plurality.

2. The improved communications system of claim 1 wherein said dispersion compensating grating compensates the net negative dispersion of all signal channels in the plurality.

3. The improved communications system of claim 1 wherein said dispersion compensator further comprises an optical circulator coupling the grating to the transmission path.

4. The improved communications system of claim 1 wherein said dispersion compensating grating compensates the net negative dispersion and the dispersion slope of at least two signal channels in the plurality.

5. The improved communications system of claim 1 wherein said dispersion compensating grating compensates both the net negative dispersion and the dispersion slope of all signal channels in the plurality.

6. The improved communications system of claim 1 wherein the dispersion compensator comprises a chirped fiber Bragg grating.

7. The improved communications system of claim 1 wherein said optical transmission path comprises one or more lengths of optical fiber which together a net negative dispersion for the signal channels.

8. A dispersion compensating module for compensating signal channels in a wavelength range of interest comprising:

an optical circulator having at least three ports; a first port coupled to the input port of the module, a second port coupled to a dispersion compensating element and a third port coupled to the output port of the module; and wherein the dispersion compensating element comprises a length of optical fiber with positive dispersion over the wavelength range and at least one dispersion compensating grating coupled to the fiber, the grating being reflective in the wavelength range and having positive dispersion.

9. The dispersion compensating module of claim 8 wherein the module's net dispersion is positive in the wavelength range and its dispersion slope is negative.

10. The dispersion compensating module of claim 8 wherein the module's net dispersion is positive in the wavelength range and its dispersion slope is positive.

11. The dispersion compensating module of claim 8 wherein the wavelength range of interest comprises 1520 nm to 1620 nm.

12. The dispersion compensating module of claim 8 further comprising one or more optical fiber amplifiers coupled to the circulator.

13. A dispersion compensating module for compensating signal channels in a wavelength range of interest comprising:
   an optical circulator having at least three ports; a first port coupled to the input port of the module, a second coupled to a dispersion compensating element and a third port coupled to the output port of the module; and
   wherein the dispersion compensating element comprises a length of optical fiber with negative dispersion over the wavelength range and at least one dispersion compensating grating coupled to the fiber, the grating being reflective in the wavelength range and having positive dispersion.

14. The dispersion compensating module of claim 13 wherein the module's net dispersion is positive in the wavelength range and its dispersion slope is positive.

15. The dispersion compensating module of claim 13 wherein the module's net dispersion is positive in the wavelength range and its dispersion slope is negative.

16. The dispersion compensating module of claim 13 wherein the wavelength range of interest comprises 1520 nm to 1620 nm.

17. The dispersion compensating module of claim 13 further comprising one or more optical fiber amplifiers coupled to the input port or the output port of the module.

* * * * *